(12) United States Patent
Sheriff (10) Patent No.: US 11,676,137 B2
(45) Date of Patent: Jun. 13, 2023

(54) PAYMENT SCHEMES USING LIGHT IDENTIFICATION FOR PASSENGERS IN COMMERCIAL PASSENGER VEHICLE

(71) Applicant: Panasonic Avionics Corporation, Lake Forest, CA (US)

(72) Inventor: FaizalSheriff kalifullah Sheriff, Irvine, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 661 days.

(21) Appl. No.: 16/717,327

(22) Filed: Dec. 17, 2019

(65) Prior Publication Data

US 2021/0182845 A1     Jun. 17, 2021

(51) Int. Cl.
*G06Q 20/38*       (2012.01)
*G06Q 20/40*       (2012.01)

(52) U.S. Cl.
CPC ... *G06Q 20/3821* (2013.01); *G06Q 20/40155* (2020.05); *G06Q 2220/00* (2013.01)

(58) Field of Classification Search
None
See application file for complete search history.

(56) References Cited

U.S. PATENT DOCUMENTS

| | | | |
|---|---|---|---|
| 2013/0110717 A1 | 5/2013 | Kobres | |
| 2014/0156376 A1* | 6/2014 | Sellers | G06Q 20/3276 235/383 |
| 2016/0012408 A1* | 1/2016 | Stanoszek | G06Q 20/3278 705/21 |
| 2016/0210613 A1* | 7/2016 | McGill | G06K 19/06112 |
| 2016/0364723 A1* | 12/2016 | Reese | G06Q 20/38215 |
| 2018/0212679 A1 | 7/2018 | Shim et al. | |

FOREIGN PATENT DOCUMENTS

| | | |
|---|---|---|
| CN | 104166910 | 11/2014 |
| CN | 106779679 | 5/2017 |
| WO | 2014101496 | 7/2014 |

* cited by examiner

*Primary Examiner* — Jamie R Kucab
(74) *Attorney, Agent, or Firm* — Perkins Coie LLP (57) ABSTRACT

A system for assisting a payment to a passenger on a commercial passenger vehicle is disclosed. The system is located in the commercial passenger vehicle and comprises: an onboard server configured to (1) receive, from a personal electronic device associated with a passenger, a request to process a payment along with payment credential information and (2) operate to authorize the payment; a light sourcing device in communication with the onboard server and configured to receive, from the onboard server, a verification request for the payment credential information, and display a light identification (ID); and the personal electronic device in communication with the onboard server and the light sourcing device and configured to capture an image of the light ID and obtain the verification request corresponding to the payment credential information from the captured image.

22 Claims, 6 Drawing Sheets

PAYMENT SCHEMES USING LIGHT IDENTIFICATION FOR PASSENGERS IN COMMERCIAL PASSENGER VEHICLE

TECHNICAL FIELD

This document relates to payment schemes for passengers in a commercial passenger vehicle such as airplanes, passenger train buses, cruise ships, and others.

BACKGROUND

Passengers travelling to their destinations in commercial passenger vehicles are provided with an opportunity to purchase items while travelling. The sales to the passengers travelling in a commercial passenger vehicle can create more revenues to vehicle companies. To support and facilitate the sales, there are ongoing efforts to simplify and manage payments for purchases made during commercial travel.

SUMMARY

Various implementations of the disclosed technology relate to payment schemes using light identification for passengers in commercial passenger vehicle. The suggested payment schemes can allow the passengers to proceed the payment in easier and more secure manners during the travel.

In one representative aspect, a system for assisting a payment to a passenger on a commercial passenger vehicle is disclosed. The system is located in the commercial passenger vehicle and comprises: an onboard server configured to (1) receive, from a personal electronic device associated with a passenger, a request to process a payment along with payment credential information and (2) operate to authorize the payment; a light sourcing device in communication with the onboard server and configured to receive, from the onboard server, a verification request for the payment credential information, and display a light identification (ID) that corresponds to the verification request and facilitates transmitting the verification request corresponding to the payment credential information by using light provided from the light sourcing device; and the personal electronic device in communication with the onboard server and the light sourcing device and configured to capture an image of the light ID and obtain the verification request corresponding to the payment credential information from the captured image.

In another representative aspect, a system for assisting a payment to a passenger on a commercial passenger vehicle is disclosed, the system comprises: a server located in the commercial passenger vehicle and in communication with a personal electric device associated with a passenger and a light sourcing device that are located in the commercial passenger, wherein the server is configured to: send, in response to a payment authorization request from the personal electronic device, a verification request to be displayed by the light sourcing device using a light ID that corresponds to the verification request, the verification request transmittable from the light sourcing device to the personal electronic device by using light provided from the light sourcing device; receive, from the personal electronic device, a verification response corresponding to the verification request; and determine a validity of the verification response received from the personal electronic device; and authorize the payment at least partly based on the validity of the verification response.

In another representative aspect, a method is provided to comprise: receiving a request for an in-flight financial transaction at a user interface of an electronic device; sending, to an on-board server, the request for the in-flight transaction along with a payment credential information; capturing, in response to the request, a light identification (ID) displayed on a seat-back light source device based on light emissions from the light source device such that the light ID corresponds to a verification request for the payment credential information; and sending, to the on-board server, a verification response message to enable the on-board server to further process the request to obtain an approval for the in-flight financial transaction.

The above and other aspects and their implementations are described in greater detail in the drawings, the descriptions, and the claims.

DETAILED DESCRIPTION

The techniques disclosed in this document provide payment schemes for passengers in a commercial passenger vehicle using light ID technology. In some implementations, by providing the payment schemes using the light ID technology, it is possible to provide easier and more convenient ways to process a payment for passengers in a commercial passenger vehicle while ensuring a secure payment process.

Payments for transactions made during travelling of passengers in the commercial passenger vehicle are unique in that passengers who request authorizations of purchases are travelling in the commercial passenger vehicle and thus some limitations on accessing to transaction authorizing elements such as banks, credit card companies, or third party transaction processing services exist. Due to this unique nature, there is a need for payment schemes that are specifically developed for passengers in commercial passenger vehicles.

In conventional technologies, digital wallets like Google, ApplePay use Near Field Communication (NFC) for sending the payment information. Other digital wallets like AliPay (e.g., a third-party mobile and online payment platform, established in Hangzhou, China in February 2004 by Alibaba Group) use a QR Code (e.g., a machine-readable code consisting of an array of black and white squares, typically used for storing URLs or other information for reading by the camera on a smartphone) to send payment information. The NFC technologies, however, require that users are present inside a reading area from another device which processes payments. The QR code technologies require actual scanning of a QR code by a QR code scanner and the QR code needs to be in a right form to work properly with the QR code scanner.

The technical solutions described in the present document can provide new payment schemes that are designed for passengers in a commercial passenger vehicle. Unlike image reading methods such as QR codes or AR (Augmented Reality) markers, the suggested technologies do not require an actual scanning using a specific scanner or specific receiving device. Thus, none of passengers and flight attendants do not need to hold the scanner or receiving device in a specific position, which saves time for focusing to create a complex image recognition. In addition, the suggested technologies allow the payment process to proceed at a higher transmission rate and provide low interference transmissions.

Figure 1:
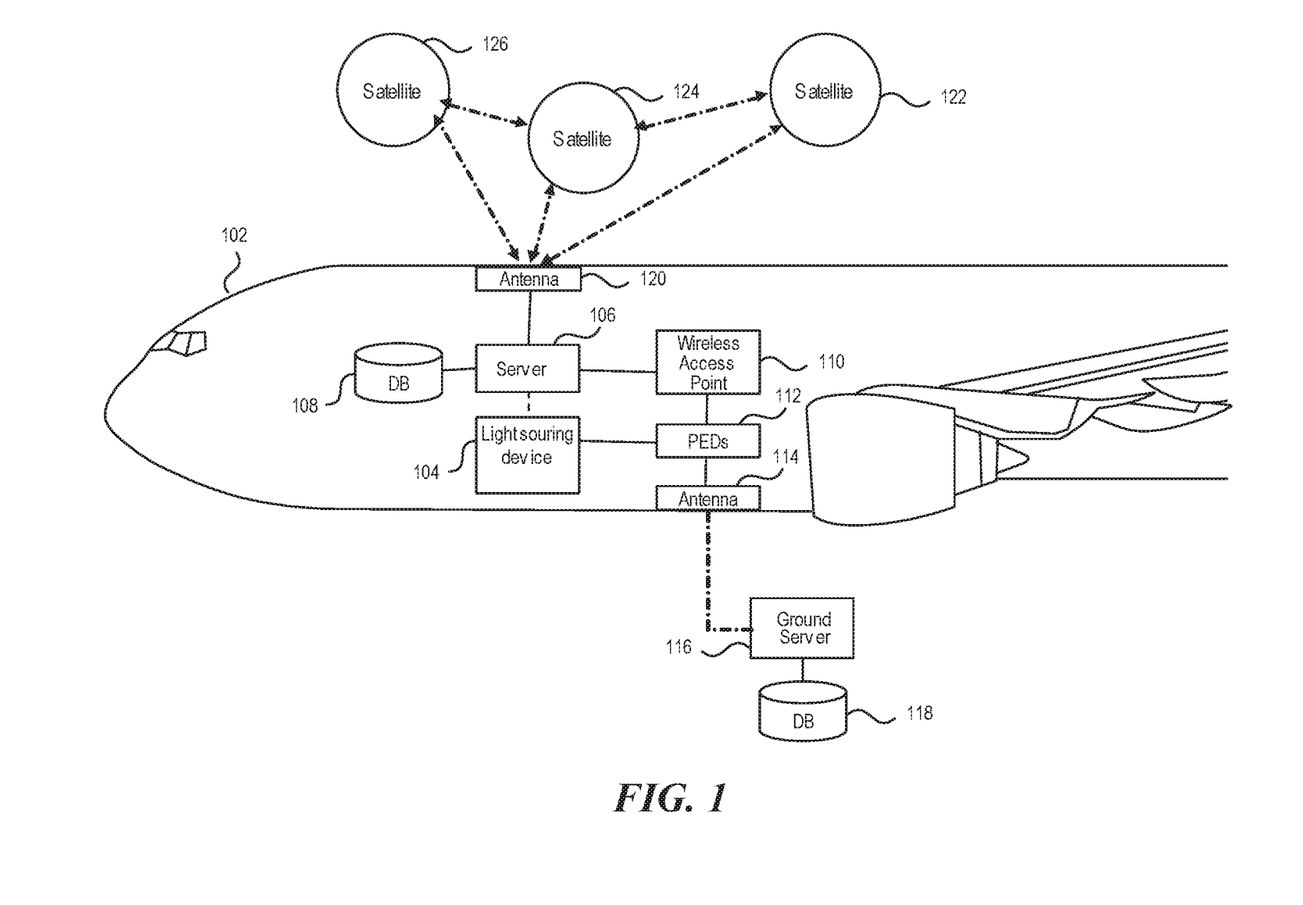
FIG. 1 shows an example of an in-flight payment system installed in an airplane based on some implementations of the disclosed technology.

FIG. 1 shows an example of a payment system for passengers in an airplane ("in-flight payment system") based on some implementations of the disclosed technology.

The in-flight payment system includes a server 106, a light source device 104 such as a smart monitor, LED device, or a media playback device located behind a headrest of a seat, and a PED (personal electronic device) that are located in the airplane 102. The components shown as a single element in FIG. 1, e.g., the server 106, the database 108, etc. can be configured in multiple elements. For example, the in-flight payment system can include multiple servers and multiple databases to facilitate the providing of the entertainment options to the passengers. The in-flight payment system suggested in this patent document utilizes light identification technologies to process a payment and the in-flight payment system is configured to generate a light identification associated with the payment and exchange information using the light identification. The light identification technology is a pulse width modulation communication produced by modulating a backlight of the light source device 104. Systems and methods for displaying a pulse width modulation communication by modulating a light, such as a backlight of a monitor, are described in U.S. Pat. No. 9,166,810, filed on May 24, 2013, which is hereby incorporated by reference herein in its entirety.

The light ID image corresponding to the payment credential information is provided on the light source device 104 and converted into a pulse width modulated flashing pattern of the backlight, typically in frequency range, for example, from 1 kHz-20 kHz. The light ID communication has a number of significant advantages over other means of transmitting payment information. The light ID communication has a faster response time compared to many radio frequency communications, such as Bluetooth communication, and other optical code reading methods, such as QR codes, bar codes, and others. The light ID communication generally does not require linking, pairing, or signing in with username and/or password, such as required by Bluetooth, Wi-Fi, and others. Unlike image reading methods such as QR codes or AR markers, the light identification does not require users to hold the receiver in a specific position, and it also does not require time for focusing and complex image recognition. The light identification can be simply and immediately recognized by pointing an imaging device (e.g., camera) of the user device such as PED 112 towards the light source device even from a distance, eliminating the need to navigate through crowds to approach light source codes. The information is then read by dividing the received light ID image into blocks. This enables rapid decoding of information at a rate surpassing that of the user device video recording (frame rates). Also, unlike information transmission systems using Bluetooth (R) or ultrasonic waves, radio and sound wave interference is not an issue.

Most travelers carry PEDs having wireless communication capability, such as cellular phones, smart phones, tablet computers, laptop computers, and other portable electronic devices. Many of these PEDs have the capability to execute application software programs ("apps") to perform various functions, including controlling other devices and systems. For example, the PED 112 includes a digital wallet software application to support the in-flight payment services suggested in this patent document. The digital wallet software application is configured to program the PED 112 to perform the required functionalities and operations of the PED as will be further described with reference to FIGS. 4 and 6. The PED 112 further includes a light ID reading software to read the captured light identification image. The digital wallet software application can be configured to include the light ID reading software or the light ID reading software can be provided separately from the digital wallet software application.

The server 106 is communicably coupled with the light sourcing devices 104 and the PEDs 112. The communication between the server 106 and the onboard devices including the light sourcing devices 104 and the PEDs 112 is either realized by wired connections or wireless connections. For example, the communication among the server 106, the light sourcing devices 104, and the PEDs 112 are achieved, e.g. in the case of mounted seat entertainment terminals or by a provision of network plugs at the seat for plugging PEDs 112 to a wired onboard local area network. In some other implementations, the communications among the server 106, the light sourcing devices 104, and the PEDs 112 are achieved, e.g. via a GSM/3G/4G cellular network utilizing one or more onboard base station(s), WiFi such as the wireless access point 110, and/or by Bluetooth. Thus, the server 106, the light sourcing device 104, and the PEDs 112 form a local network aboard the airplane 102. In some implementations, the network is an Ethernet switch but can be based on other networking standards. The in-flight payment system can include an Ethernet switch unit which appropriately routes Ethernet frames carrying data and/or contents among the server 106, the light sourcing devices 104, and PEDs 112 on the network. The Ethernet switch unit may allow various Ethernet devices on the aircraft (e.g., the server 106, the light sourcing devices 104, the PEDs 112, etc.) to communicate with one another.

The server 106 is further communicatively coupled with a ground server 3 which is located outside the airplane 102, e.g. located in a computing center at an arbitrary location on the ground. The communication between the server 106 and the ground server 3 can utilize a wireless interface. For example, a satellite communication module and/or 3G/4G/5G transceiver module is mounted within the airplane 102 to which the server 106 is connected. The onboard server's connection to this communication module is realized via a wired line or, alternatively, via a wireless connection, e.g. by WiFi. The communication module can also be attached to or integrated into the server 106. In the example of a satellite communication module, the communication module communicates via satellites 122, 124, and 126 (utilizing antennas 120 installed at the airplane 102) via one or more landline-based networks (WAN, Internet) to the ground server 3. In the example of a 3G/4G/5G transceiver module, the communication module communicates with a 3G/4G/5G mobile communication network on the ground which, in turn, connects the server 106 through potentially further landline-based networks (WAN, Internet) to the ground server 116.

The light source device 104 is configured to receive at least a part of the payment credential information of the passenger from the server 106 and display the light identification corresponding to the received payment credential information. The light ID can be converted into the pulse width modulated flashing pattern of the backlight by the light source device 104. The light source device 104 can be implemented at least one of the smart monitor, the LED device, a media playback device, or any displays that can illuminate the light ID. The smart monitor may refer to a display providing access to communication applications, internet browsing, and other computer applications, etc. In some implementations, the light source device 104 may be provided at each passenger seat such as mounted at each of the seatbacks of the passenger seats and allow each passenger to select from multiple video channels and/or audio channels, or even individually select and play videos from a library of videos.

The ground server 116 may provide the server 106 with basic and updated user data and authentication results as will be further explained in detail later. In some implementations, the ground server 1160 works as the source of the user data or operate as an interface to other servers and networks hosting the user data and authentical results. For example, the server 106 can obtain from the ground server 116 information about passengers and stores the obtained passenger information in the database 108. For example, when the airplane 102 is waiting at an airport to board passengers or while the passengers are boarding the airplane 102, the server 106 can obtain from the ground server 116 information about passengers that are located in or are expected to board the airplane.

Figure 2:
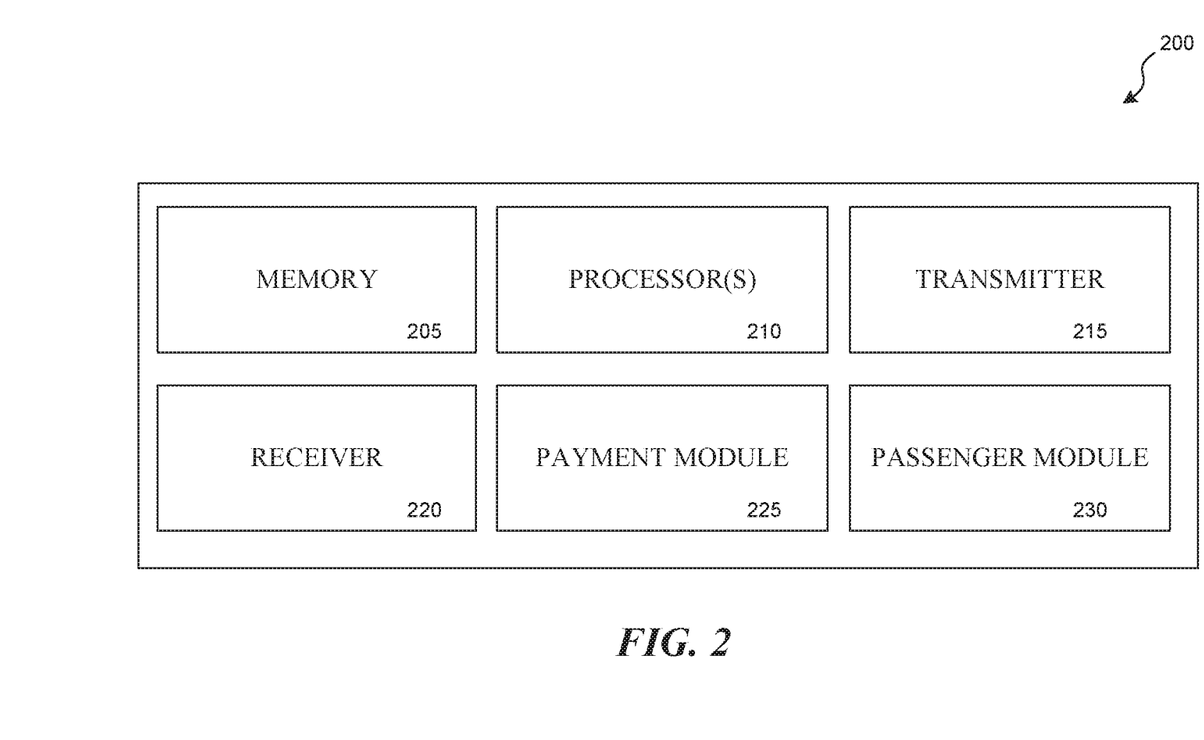
FIG. 2 shows an exemplary block diagram of a server included in an in-flight payment system based on some implementations of the disclosed technology.
Figure 4:
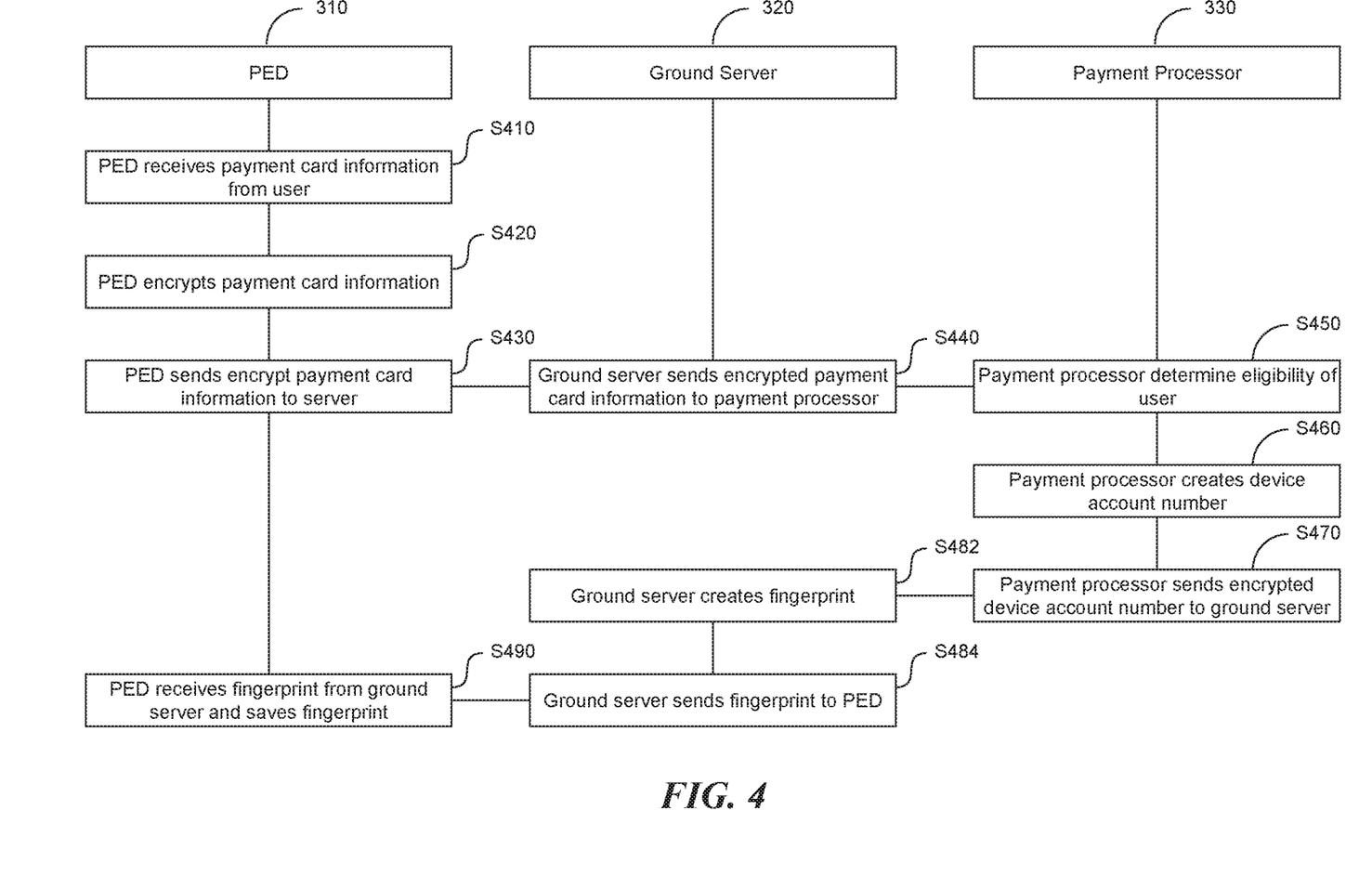
FIG. 4 shows an example flowchart performed during an enrollment process based on some implementations of the disclosed technology.
Figure 6:
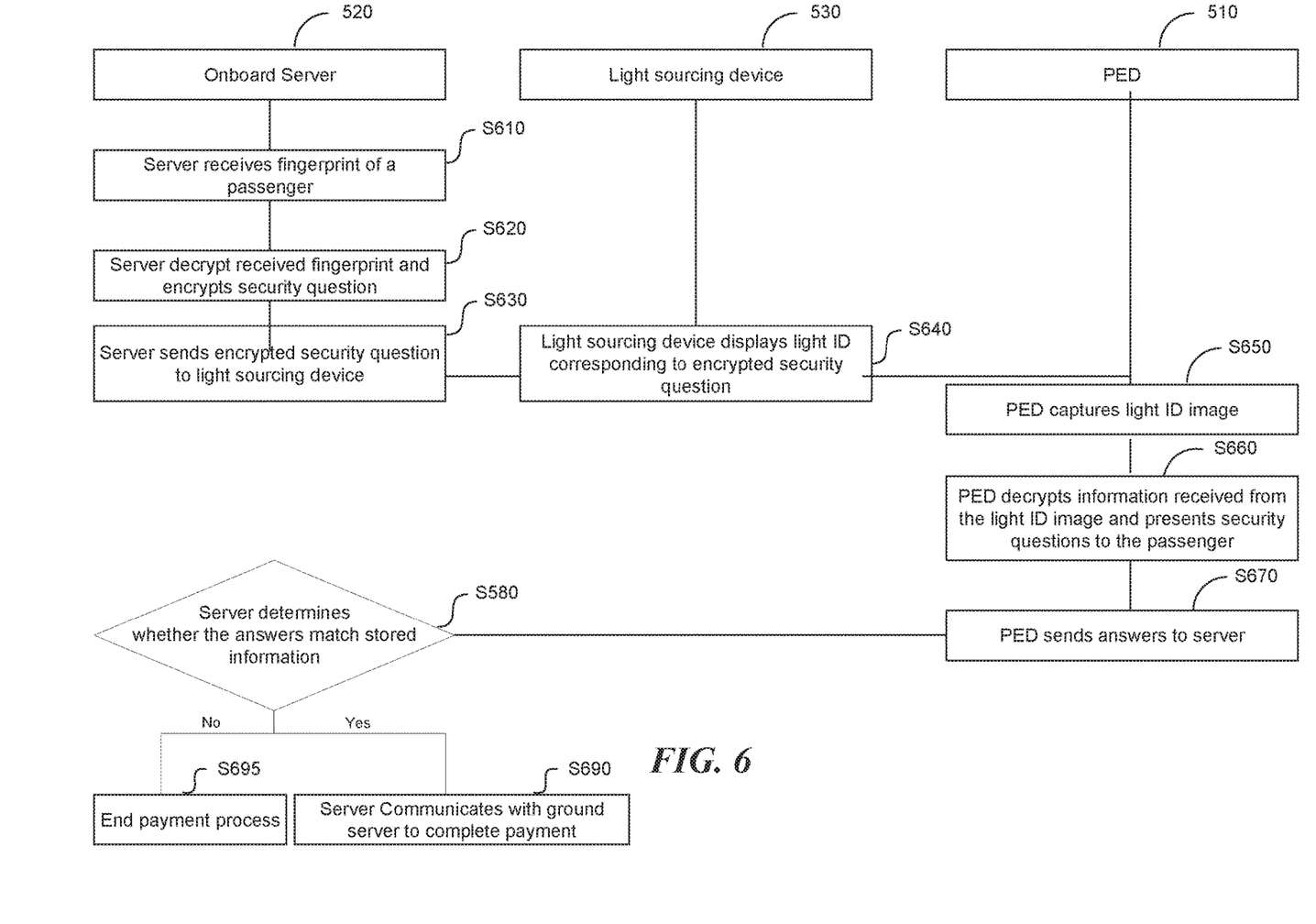
FIG. 6 shows an example flowchart for processing a payment made in an airplane based on some implementations of the disclosed technology.

FIG. 2 shows an example block diagram of a server that is a part of an example of the in-flight payment system. The server 200 includes at least one processor 210, a memory 205, a transmitter 215, a receiver 220, a payment module 225, or a passenger module 230. The memory 205 may store instructions to be executed by the processor 210. In other embodiments, additional, fewer, and/or different elements may be used to configure the server 200. The memory 205 is an electronic holding place or storage for information or instructions so that the information or instructions can be accessed by the processor 210. The memory 905 can include, but is not limited to, any type of random access memory (RAM), any type of read only memory (ROM), any type of flash memory, etc. Such as magnetic storage devices (e.g., hard disk, floppy disk, magnetic strips, etc.), optical disks (e.g., compact disk (CD), digital versatile discs (DVD), etc.), smart cards, flash memory devices, etc. The instructions upon execution by the processor 210 configure the server 200 to perform the operations (e.g., the operations as shown in FIGS. 4 and 6) which will be described in this patent document. The instructions executed by the processor 210 may be carried out by a special purpose computer, logic circuits, or hardware circuits. The processor 210 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 210 can perform the operations called for by that instruction. The processor 910 operably couples with the memory 204, transmitter, 214, the receiver, 220, the payment module 225, and the passenger module 230, etc. to receive, to send, and to process information and to control the operations of the server 200. The processor 210 may retrieve a set of instructions from a permanent memory device such as a ROM device and copy the instructions in an executable form to a temporary memory device that is generally some form of RAM. In some implementations, the server 200 can include a plurality of processors that use the same or a different processing technology. The transmitter 215 transmits or sends information or data to another device (e.g., another server 116, light sourcing devices 104, or PEDs 112). The receiver 220 receives information or data transmitted or sent by another device (e.g., another server 116, seatback devices 104, or PEDs 112). The payment module 225 of the server 200 is configured to perform operations to assist the enrollment process and the payment process which will be further discussed with regard to FIGS. 4 and 6. In some implementations, the payment module 225 can be configured as a part of the processor 210. The passenger module 225 of the server 200 is configured to obtain information on passengers including names, prior travel histories, current travel information, any preselected movie list, preselected point of interests, interests, hobbies, etc. The passenger information can be obtained in multiple manners and stored in the passenger module 225. The passenger information can be obtained by the airlines and/or by a third-party prior to boarding of a corresponding passenger. In some implementations, if the passenger information was previously obtained and is stored in the relevant database, the server 200 can collect the passenger information from the relevant database. In some embodiments, for each flight, the ground server 116 may obtain names of the passengers that are expected to board the airplane 102 and information associated with the passengers.

Figure 3:
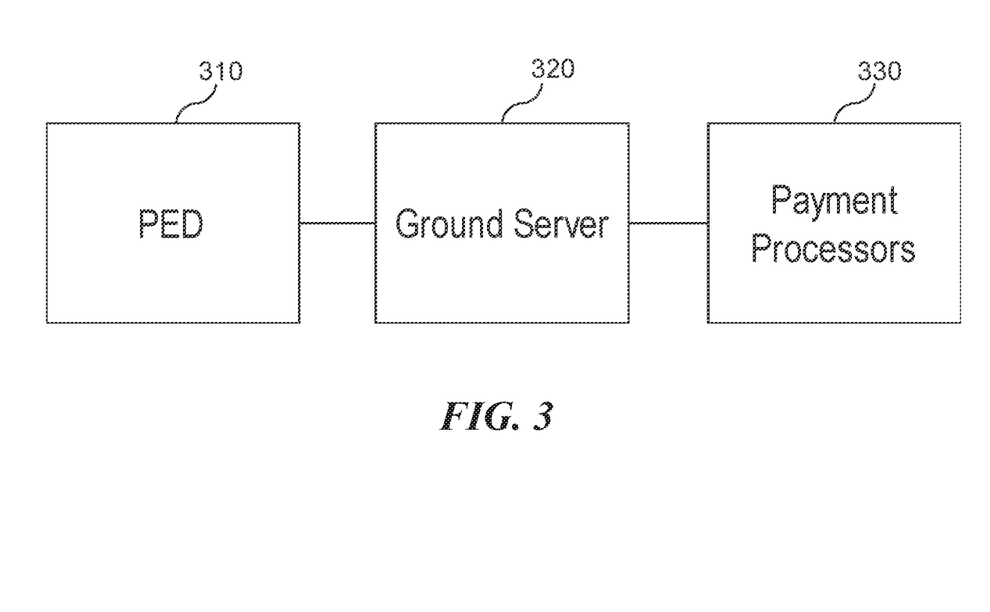
FIG. 3 shows an example diagram to explain a digital wallet enrollment process based on some implementations of the disclosed technology.

In some embodiments, to use the in-flight payment services using techniques disclosed in this patent document, a passenger may enroll his or her payment information in a digital wallet configured to support the in-flight payment services. The digital wallet can be an application software installed on and executed by the PED 310. Alternatively, the digital wallet may be a dedicated electronic device that may be provided by the airlines to the passenger for the travel. Alternatively, the digital wallet may be a field re-programmable chip card. FIG. 3 shows an example diagram to explain an enrollment process based on some implementations of the disclosed technology.

FIG. 4 shows an example flowchart to explain an enrollment process based on some implementations of the disclosed technology. Referring to FIGS. 3 and 4, to process the enrollment process, the PED 310 and the ground server 320 are communicatively coupled and the ground server 320 is further communicatively coupled with payment processors such as banks, card issuers, or other authorized service providers. The enrollment process can be performed any time before boarding the airplane or even after boarding the airplane but prior to process the payment using the digital wallet.

At S410, the enrollment process starts when the PED 310 receives payment card information from a user. The payment information includes at least one of a payment card number, expiration date of the payment card, and a card verification value (CVV) and the payment card can be any of a credit card, a debit card, a prepaid card, or a transit card (where available). In some implementations, the PED 310 receives the payment card information by using an imaging device (e.g., camera) of the PED 102 to capture an image of the payment card and a software to recognize necessary information from the captured image. The payment card information received from the user and/or from the imaging device is not saved on the PED and/or a photo library.

At S420, the PED 310 encrypts the payment card information received from the user with a key that is supplied as a part of an application server that is supplied to uniquely identify the PED, e.g., during an installation of the digital wallet software. At S430, the PED 310 sends the encrypted payment card information to the ground server 330. The communication with the ground server 330 may occur over public internet, e.g., when the user is on ground, or through a private internet, e.g., when the user is already inside the airplane. After receiving the encrypted payment card information from the PED 310, at S440, the ground server 330 sends encrypted payment card information to a corresponding payment processor 330. In some implementations, although not shown in FIG. 4, to identify the corresponding payment processor 330, the ground server 330 decrypts the payment card information sent from the PED 310 at S430. Several payment processors can form a payment network together and for this case, the ground server 320 can be configured to identify a corresponding payment network. After determining the corresponding payment processor/network, the ground server 330 re-encrypts the payment card information with a key that only the payment processor (or any payment provider authorized by the payment processor) can unlock. The re-encrypted payment card information is sent to a corresponding payment processor/network 330.

At S450, the payment processor 330 can unlock the re-encrypted payment card information and determine the eligibility of the user for activating the digital wallet. Upon determining that the user is eligible to activate the digital wallet, at step S460, the payment processor 330 creates a device account number that is device-specific and/or a user-specific and encrypts the device account number. At step S470, the payment processor 330 sends the encrypted device account number to the ground server 320. In some implementations, the payment processor 330 can send other data such as a security key used to generate dynamic security codes that are unique to each transaction along with the device account number to the server. The ground server 320 receives from the payment processor 330 information including the device account number and other data such as the security key. The device account number is not decrypted by the ground server 320 and is stored in, for example, a hardware security module (HSM). In some implementations, the ground server 320 may prompt users to compose one or more security question and corresponding answers as a multifactor authentication and this information can be used to authorize the payment. The information including the device account number, a security key, one or more security questions and corresponding answers can be referred to as a payload. The payload is encrypted by the ground server and the encrypted payload may be referred to as a fingerprint. Thus, at S482, the ground server 320 creates the fingerprint based on the received information. The payload can be encrypted by various encryption mechanisms, for example, an advanced encryption standard (AES) encryption mechanism and appended to the device account number. The keys to the AES encryption are encrypted by a Rivest Shamir Adleman (RSA) authentication mechanism and appended to the payment credential information of the passenger. The payload is further encrypted with a RSA authentication mechanism and then the encrypted answer is referred to as the fingerprint. At S484, the ground server 320 sends the fingerprint to the PED 310. At S490, the PED 310 receives the fingerprint from the ground server 320 and saves it on the PED 310.

Figure 5:
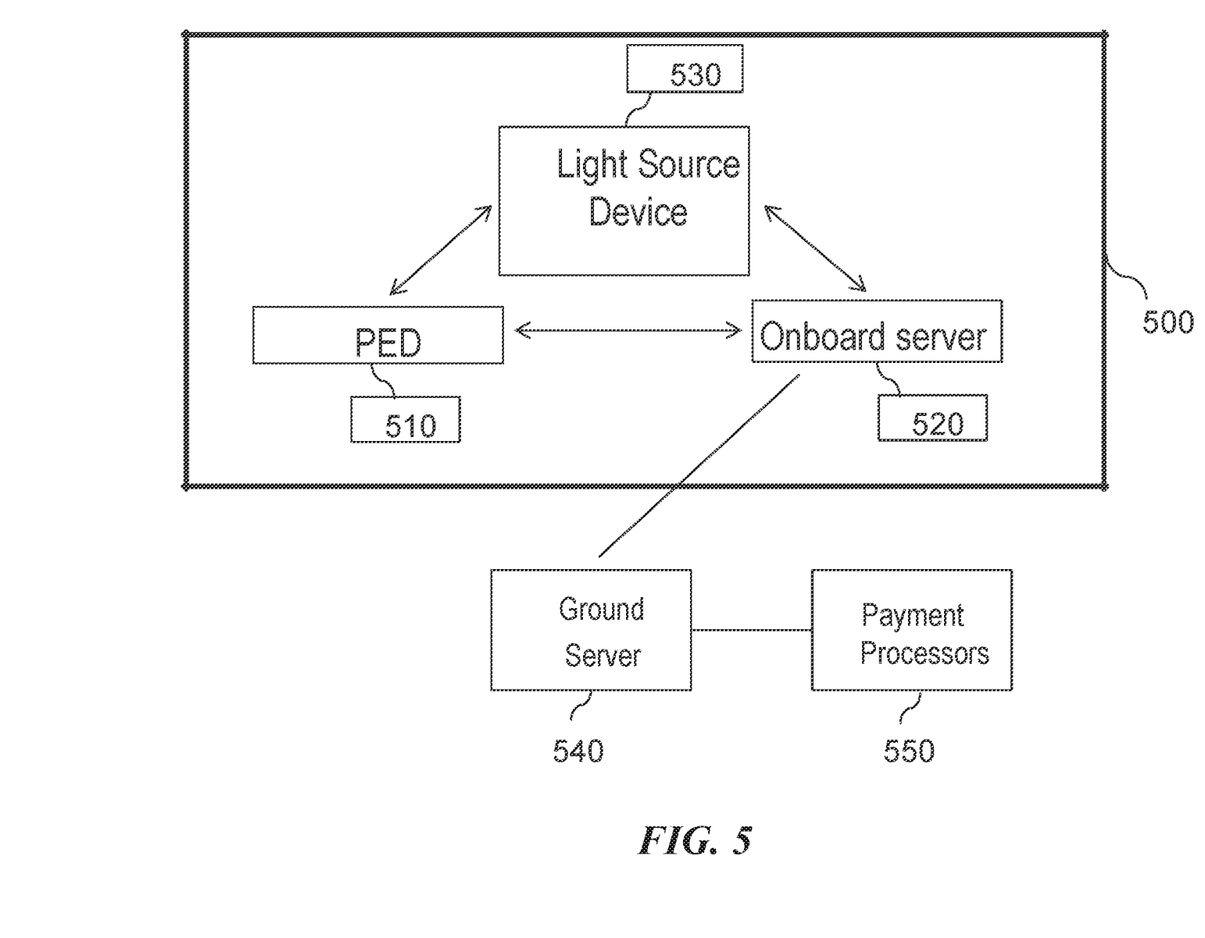
FIG. 5 shows an example diagram to explain operations to process a payment made in an airplane based on some implementations of the disclosed technology.

FIG. 5 shows an example diagram to process a payment made in an airplane based on some implementations of the disclosed technology. FIG. 6 shows an example flowchart for processing a payment made in an airplane based on some implementations of the disclosed technology. Referring to FIG. 5, the PED 510, the onboard server 520, and the light source device 530 are located inside the airplane 500 and communicates one another to process the payment. The onboard server 520 further communicates with the ground server 540 which communicates with the payment processors 550.

A passenger who has previously enrolled his or her payment card in the digital wallet initiates the in-flight payment services by sending the fingerprint to the onboard server 520. At step S610, the onboard server 520 receives the fingerprint of the passenger from the PED 510. As previously explained with regard to the enrollment of the payment card, the fingerprint corresponds to the encrypted payload. At step S620, the onboard server 520 decrypts the received fingerprint. In some implementations, the onboard server 520 decrypts the fingerprint using the RSA authentication mechanism which extracts one or more keys that are used to decrypt the security questions and corresponding answers. The onboard server 520 is designed to encrypt at least one security question. In some implementations, the onboard server 520 encrypts the security question using the two-way encryption with a private key and a public key that form a pair specific to each fingerprint. In some implementations, the onboard server 520 runs software to look for AES keys whereas the application on the PED 510 does not know where and how to look for the keys. The onboard server 520 can use a randomizing algorithm to pick one or more numbers that correspond to the question numbers, and the questions are then encrypted with RSA. The encrypted security question is sent to the light sourcing device 530 at step S630. At step S640, the light sourcing device 530 displays a light identification corresponding to the security question. In some implementations, the light sourcing device 530 generates the light identification (e.g., a binary code) corresponding to the security question. In some embodiments, the light identification is a pulse width modulation communication produced by modulating the backlight of the light sourcing device 530.

The light sourcing device 530 sends the encrypted security question to the PED 510. At step S650, the PED 510 captures the light ID image. In this regard, the PED includes a software application which programs the PED 510 to receive the light ID displayed on the light sourcing device. In some implementations, the light ID can be captured by the PED 510 by using an imaging device of the PED 512. At step S660, the PED 510 decrypts the light ID image, which proceeds to present one or more security questions to the passenger. In some implementations, the PED 510 uses RSA to decrypt the information received through the light ID and presents the two or more MFA questions to the passenger. In some implementations, the PED 510 decrypts a private key used during the enrollment process and presents the private key to the passenger for the confirmation. Thus, as the result of the step S660, the passenger is provided with one or more security questions or the confirmation of the private key and thus the passenger may enter answer(s) or the confirmation. At step S670, the PED 510 sends answers (or confirmation) which are received from the passenger to the onboard server

520. In some implementations, the two-way encryption using the public key and the private key can be used. At step S680, the onboard server 520 determines whether the answers received from the PED 510 match the information stored. If it is determined at step S680 that the answers received from the PED 510 do not match the information stored, the corresponding payment process will be ended without further processing. If it is determined at step S680 that the answers match the information stored, the process proceeds to step S690 where the onboard server 520 proceeds to complete the payment process. The step S690 can be performed different manners based on the connection availability of the airplane. If the connection between the onboard server 520 and the ground server 540 is available, the onboard server 520 can receive a live authentication through the ground server 540 and process the payment. If the connection between the onboard server 520 and the ground server 540 is not available, the onboard server 520 can record the payment as authorized and send an affirmative response back to the passenger's PED 510. In this case, when the connection between the onboard server 520 and the ground server 540 becomes available, the payment process will be further processed between the onboard server 520 and the ground server 540.

The following descriptions describe the functionalities/operations of each element disclosed in FIG. 3 or 5.

Functionalities or Operations of Elements During Enrollment Process

The PED 310 is communicatively coupled with the ground server 320 which is communicatively coupled with the payment processors 330. The PED 310 is configured to (1) send payment card information provided from a passenger to the ground server 320 and (2) obtain fingerprint as an approval on using the in-flight payment services from the ground server 320. The fingerprint corresponds to encrypted information including a device-specific account number, a security key, and security questions and corresponding answers. The ground server 320 is configured to (1) receive the encrypted payment card information from the PED 310, (2) decrypt the received encrypted payment card information to determine a payment network to communicate for an eligibility for the in-flight payment services, (3) re-encrypt the decrypted information to send the re-encrypted information to the determined payment network (e.g., a payment processor 330), (4) receive, from the payment processor 330, encrypted information including device account number and/or a security key, (5) prompt one or more security questions and corresponding answers as a multifactor authentication, (6) generate a fingerprint that is encrypted information including the device account number, the security key, the security questions and corresponding answers. The payment processor 330 is configured to (1) receive the re-encrypted information including the payment card information, (2) determine the eligibility of a user who sends the request to enroll his or her card information to use the in-flight payment services, (3) generate the device account number which is device-specific and/or user-specific, and (4) send the device account number along with other data such as a key used to generate security codes.

Functionalities or Operations of Elements During Process of Payment

The PED 510 is communicatively coupled with the onboard server 520 and the light sourcing device 530. The PED 510 is configured to send, to the onboard server 520, a request to process the payment for a purchase made in the commercial passenger vehicle along with the fingerprint, (2) capture a light identification (ID) displayed on a light sourcing device using light provided from the light sourcing device, the light ID corresponding to an encoded verification request corresponding to the fingerprint, (3) decrypt information received from the light ID and present one or more security questions to the passenger, and (3) provide answers to the security questions as a verification response to the onboard server 520. The onboard server 520 is configured to (1) receive, from the PED 510, the request to process the payment along with the fingerprint, (2) decrypt the fingerprint to extract a key that decrypts the questions and answers, (3) encrypt at least one question and send the encrypt question to the light sourcing device 530, (4) receive, from the PED 510, the verification response, (5) determine a validity of the verification response received from the PED 510, and (6) authorize the payment at least based on the validity of the verification response. The light sourcing device 530 is configured to (1) receive the encrypted question from the onboard server 520 and (2) display light ID corresponding to the received encrypted question.

This patent document describes the exemplary vehicle entertainment systems in the context of a commercial passenger vehicle such as an airplane for ease of description. The exemplary vehicle entertainment systems could be employed in other types of commercial passenger vehicle such as a train, a ship, or a bus.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A system for assisting a payment for a passenger on a commercial passenger vehicle, the system located in the commercial passenger vehicle and comprising:
    an onboard server configured to (1) receive, from a personal electronic device associated with a passenger, a request to process a payment along with encrypted information associated with the passenger and including a device-specific account number, a security key, and security questions and corresponding answers; (2) decrypt the encrypted information to extract one or more keys with which the security questions and the corresponding answers are decrypted; (3) select and encrypt at least one security question from the security questions; (4) send, in response to the request from the personal electronic device, a verification request with the at least one security question that is encrypted; (5) receive, from the personal electronic device, a verification response corresponding to the at least one security question; (6) determine a validity of the verification response received from the personal electronic device in response to a determination that an answer in the verification response matches the at least one security question; and (7) operate to authorize the payment;
    a light sourcing device in communication with the onboard server and configured to receive, from the onboard server, the verification request for the encrypted information, and display a light identification (ID) that corresponds to the verification request and facilitates transmitting the verification request corresponding to the encrypted information by a modulation of light provided from the light sourcing device; and
    the personal electronic device in communication with the onboard server and the light sourcing device and configured to capture an image of the light ID and obtain the verification request corresponding to the encrypted information from the captured image.

2. The system of claim 1, wherein the personal electronic device is configured to store the encrypted information that has been previously enrolled to process the payment prior to sending the request to process the payment.

3. The system of claim 2, wherein the encrypted information is stored in the personal electronic device.

4. The system of claim 1, wherein the encrypted information is encrypted by using a Rivest Shamir Adleman (RSA) authentication mechanism.

5. The system of claim 1, wherein the onboard server is further configured to decrypt the encrypted information to obtain a key that decrypts a security question and a corresponding answer and provide an encoded security question to light sourcing device, the verification request corresponding to the encoded security question.

6. The system of claim 1, wherein the onboard server is further configured to use a private key and a public key to encrypt and decrypt the encrypted information.

7. The system of claim 1, wherein the light sourcing device includes at least one of a light emitting device, a smart monitor, or a media playback device with a display portion that is located behind a headrest of a seat in the commercial passenger vehicle.

8. The system of claim 1, wherein the personal electronic device is further configured to decrypt the verification request and present one or more MFA (Multi-Factor Authentication) questions to the passenger.

9. The system of claim 1, wherein the personal electronic device is further configured to provide, to the onboard server, a verification response corresponding to the verification request.

10. The system of claim 1, wherein the onboard server is further in communication with a ground server located outside the commercial passenger vehicle.

11. A system for assisting a payment for a passenger on a commercial passenger vehicle, the system comprising:
    a server located in the commercial passenger vehicle and in communication with a personal electronic device associated with a passenger and a light sourcing device that are located in the commercial passenger vehicle,
    wherein the server is configured to:
        receive encrypted information associated with the passenger and including a device-specific account number, a security key, and security questions and corresponding answers;
        decrypt the encrypted information to extract one or more keys with which the security questions and the corresponding answers are decrypted;
        select and encrypt at least one security question from the security questions;
        send, in response to a payment authorization request from the personal electronic device, at least one security question that is encrypted to be communicated by the light sourcing device using a light identification that corresponds to the at least one security question, the light identification transmittable from the light sourcing device to the personal electronic device by a modulation of light provided by the light sourcing device;
        receive, from the personal electronic device, a verification response corresponding to the at least one security question; and
        determine a validity of the verification response received from the personal electronic device in response to a determination that an answer in the verification response matches the at least one security question; and
        authorize the payment at least partly based on the validity of the verification response.

12. The system of claim 11, wherein the server is further configured to communicate with another server located outside the commercial passenger vehicle based on the validity of the verification response and the payment is authorized based on a result of the communication with the another server.

13. The system of claim 11, wherein the light sourcing device includes at least one of a light emitting device, a smart monitor, or a media playback device with a display portion that is located behind a headrest of a seat in the commercial passenger vehicle.

14. The system of claim 11, wherein the light sourcing device is configured to modulate light provided by the light sourcing device.

15. The system of claim 11, wherein the server is further configured to use a private key and a public key to encrypt and decrypt the at least one security question.

16. The system of claim 12, wherein the server is configured to receive the encrypted information from the personal electronic device who has received the decryption information from the another server.

17. The system of claim 12, wherein the encrypted information is encrypted by the another server using an advanced encryption standard (AES) encryption mechanism.

18. The system of claim 11, wherein the server is configured to decrypt the encrypted information using Rivest Shamir Adleman (RSA) authentication mechanism to extract the one or more keys.

19. The system of claim 11, wherein the server is configured to run a randomizing algorithm to decide a number of the at least one security question.

20. The system of claim 11, wherein the light sourcing device is configured to receive the at least one security question and display the light identification corresponding to the at least one security question.

21. The system of claim 11, wherein the light identification corresponds to a pulse with a modulated flashing pattern of the light of the light sourcing device.

22. The system of claim 12, wherein the server is configured to receive an authentication to authorize the payment from the another server.

* * * * *